March 29, 1949.

L. G. TROREY
PHOTOGRAMMETRIC APPARATUS HAVING LIGHT DIVIDING VIEWER 2,465,617

Filed June 15, 1945

Inventor
L. G. Trorey

March 29, 1949.  L. G. TROREY  2,465,617
PHOTOGRAMMETRIC APPARATUS HAVING
LIGHT DIVIDING VIEWER Filed June 15, 1945  3 Sheets-Sheet 2

Inventor
L. G. Trorey

March 29, 1949.

L. G. TROREY 2,465,617

PHOTOGRAMMETRIC APPARATUS HAVING
LIGHT DIVIDING VIEWER

Filed June 15, 1945

Inventor
L. G. Trorey
By Mason & Downing Lubrid
attys.

Patented Mar. 29, 1949

2,465,617

UNITED STATES PATENT OFFICE 2,465,617

PHOTOGRAMMETRIC APPARATUS HAVING LIGHT DIVIDING VIEWER

Lyle Graeme Trorey, Vancouver, British Columbia, Canada, assignor to Minister of National Defence, Ottawa, Ontario, Canada Application June 15, 1945, Serial No. 599,695
In Great Britain August 24, 1943

3 Claims. (Cl. 88—74)

This invention relates to photogrammetric apparatus by means of which a rectified image of a photographic perspective is formed in such a position that a plane orthogonal projection at a desired scale may be copied therefrom.

The primary object of the present invention is to provide simple means for obviating the beforementioned drawbacks of existing apparatus but apparatus produced in accordance with the invention possesses also other advantages which will hereinafter be referred to.

The invention consists in a photogrammetric apparatus of the kind wherein means is provided for rectifying distortion of the perspective of photographs due to the optical axis of the camera being divergent due to tilt from that desired comprising means for supporting a photograph, a plane drawing surface, a transparent mirror having a uniform surfacing over the whole front surface of the same such that the incident light is in part reflected and in part transmitted, means for supporting the said mirror at a predetermined distance from the drawing surface on an axis about the centre of and normal to the same, said mirror having adjustable means by which it can be pivoted on the support about an axis parallel to the surface of the mirror and the drawing surface, means for rotating the picture support about two axes at right angles to one another, the intersection of which is at the same distance away from the drawing surface as the mirror pivot, means for moving the picture support to and away from the mirror along a line parallel to the drawing surface and a head rest associated with said mirror support whereby upon supporting the head upon the rest a picture supported on the picture support is viewed in the reflecting surface of the mirror while simultaneously the drawing surface is viewed by light transmitted through the mirror.

The invention also consists in the provision in the apparatus of a suitable head-rest by means of which the operator may easily keep his head in the one position without fatigue, thus overcoming any difficulties resulting from parallax, and may as easily regain his former position when he has had occasion to move his head.

Further features of the invention will be apparent from the description given hereafter.

The accompanying drawings illustrate one convenient form of apparatus in accordance with the invention.

Figure 1:
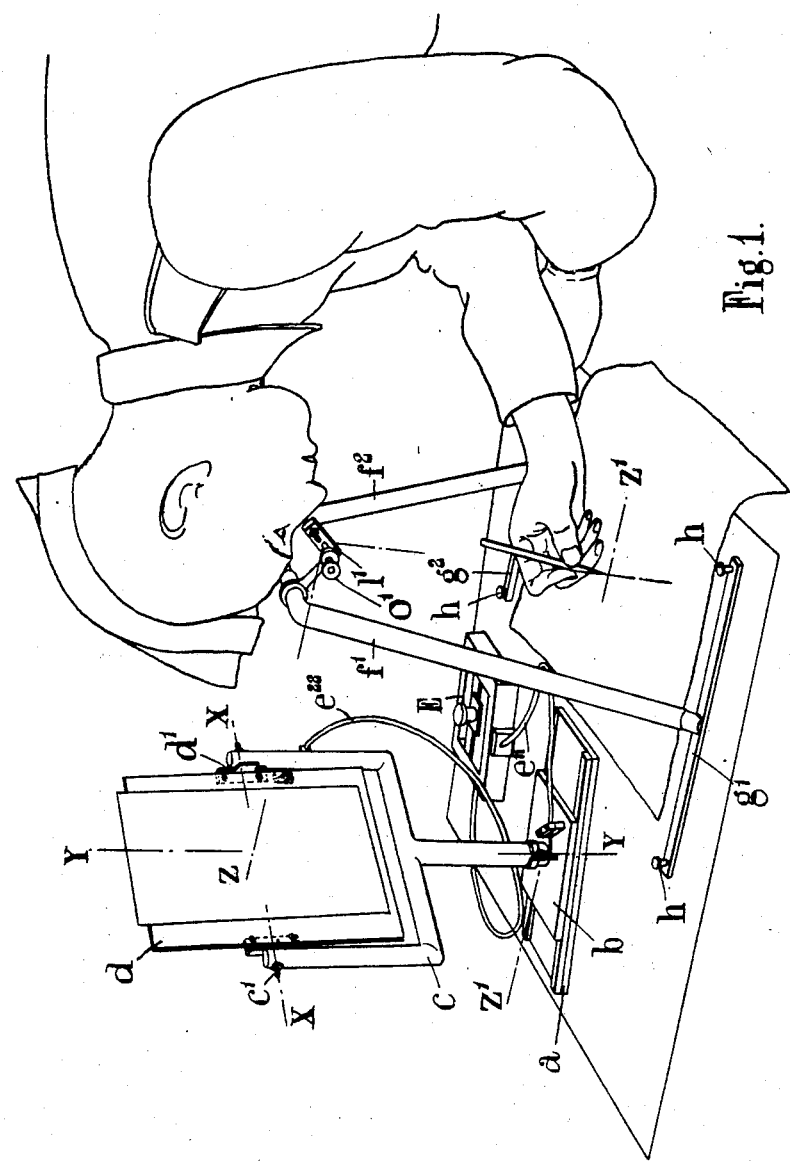
Figure 1 is a view of the apparatus in use.

In carrying my invention into effect in one convenient manner I form my improved apparatus with a base-piece $a$ adapted to be movable over the drawing surface and upon this I mount a slide $b$ movable in relation to the base-piece preferably through the aid of spring-pressed slides and the weight of the slide assembly in order to avoid the necessity for too great refinement in the manufacture and to take up wear, and as well to facilitate disassembly. The movable member or slide $b$ carries a fork or bifurcated member $c$ which is rotatable about an axis at right angles to the plane of the drawing surface and the arms of the fork carry trunnion pins $c'$ upon which the copy board $d$ is pivotally mounted through the aid of lugs $d'$ so that the axis of rotation of the trunnions (which is at right angles to the aforementioned vertical axis) lies in the plane of the front surface of a photograph when the latter is mounted upon the copy board.

The horizontal axis about which the board is movable is the X axis, the vertical axis is the Y axis, and a third axis, at right angles to these two when the tilts are zero, is the Z axis. Let Z' be the trace of the vertical axis on the drawing surface. Then a line through Z' and parallel to the Z axis may be termed the Z' axis. The Z' axis is known, in the art to which the invention relates, as the trace, on the drawing surface, of the principal plane of the projection.

The copy board is made from any suitable transparent material such, for example, as the plastic known under the registered trade-mark "Perspex" although any other suitable transparent material may be employed.

The X and Y axes are scribed on the surface of the copy board and their intersection, which is known as the principal point in the art to which the invention relates, may be filled with black printers' ink, or other suitable material, thus forming an opaque cross at the intersection of the axes upon which the photo principal point is set.

Figure 4:
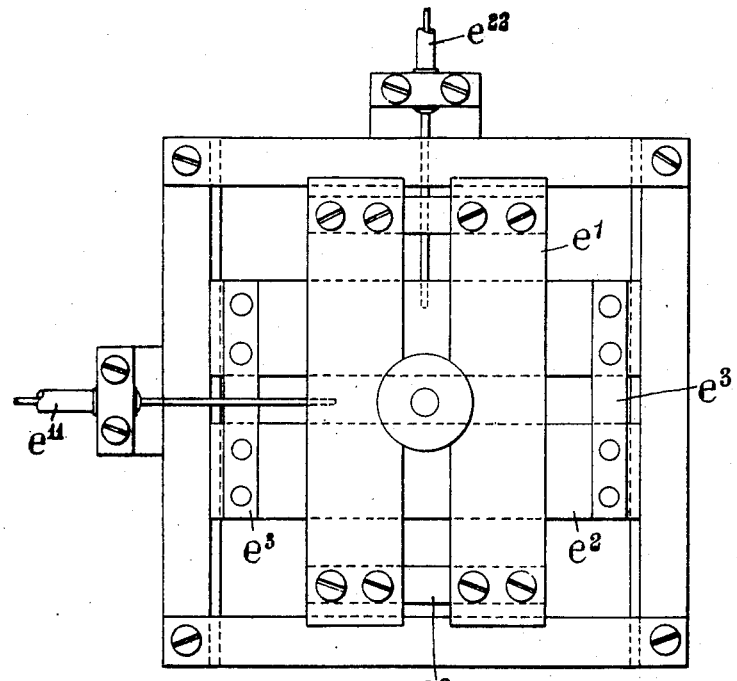
Figures 4 and 5 are a plan and a cross-sectional elevation of a still further part of the apparatus.
Figure 5:
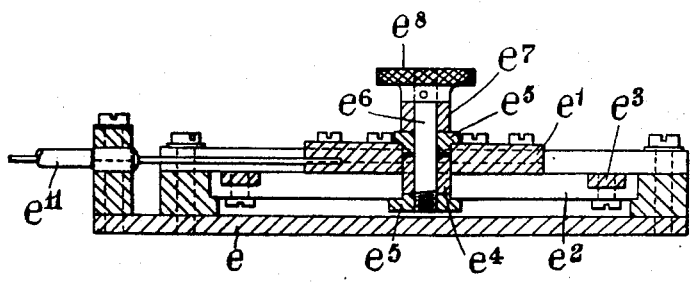

As above indicated the principal point is at the intersection of the X and Y axes and the arrangement is such that however the copy board be tilted about either or both of these axes the principal point will remain in the Z axis whatever may be the position of the slide in relation to the base. The adjustment of the copy board about the X and/or Y axes may be effected by remote control means one form of which is indicated generally at E in Figure 1 and shown in detail in Figures 4 and 5. This consists of a base $e$ having thereon two slides $e^1e^2$ arranged one above the other but at right angles to one another and movable in directions at right angles to one another. Each slide may consist of a pair of members separated a short distance by means of straps $e^3$ and the aperture represented by the intersection of the spaces of the two slides is filled by a rectangular block $e^4$ which is secured by means of washers $e^5$ upon an operating spindle $e^6$ which is surrounded by a sleeve $e^7$ and which is furnished at the top with a knurled knob or like member $e^8$, the spindle being threaded at its lower end so that it may be screwed into and out of the lower stepped washer. The arrangement is such that the operating member $e^8$ may be used to move either slide independently or both slides simultaneously in which case its movement will be the resultant of the movements of the two slides. The one slide $e^1$ is connected by sheath cable $e^{11}$ to the fork member $c$ carrying the copy board, the sheath being suitably anchored so that movement of the cable will cause the fork piece and consequently the copy board to rotate about the Y axis. The other slide $e^2$ is similarly connected by a sheath cable $e^{22}$ to an arm $e^{23}$ fixed to the copy board so that it may be rotated about the X axis and by means of the mechanism provided the board may be rotated about both axes simultaneously. When the desired adjustment has been effected, the mechanism may be locked in such adjusted position by movement of the knob $e^8$ upon the operating shaft or spindle which co-operates with the threaded stepped washer to draw the assembly together thus locking both motions. The screws uniting the straps $e^3$ to the slide members operate in holes sufficiently large to enable the slides to be adjusted against the ferrule $e^4$ so that smooth easy motion without play or backlash may result and there may be holes in the base member to permit of access to the screws of the bottom slide for the purpose of adjustment.

Figure 2:
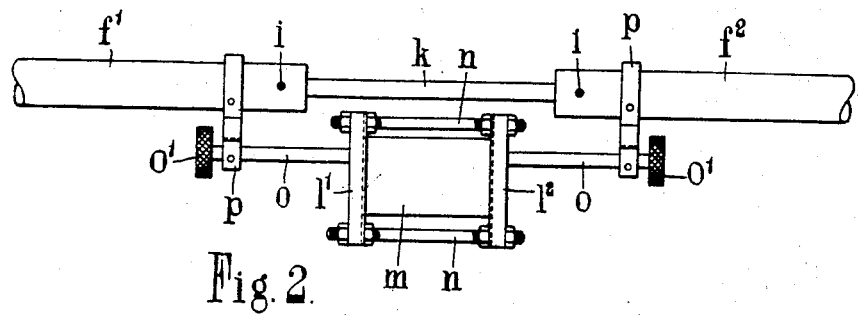
Figure 2 is a plan, on a somewhat larger scale, of a part of the apparatus shown in Figure 1.
Figure 3:
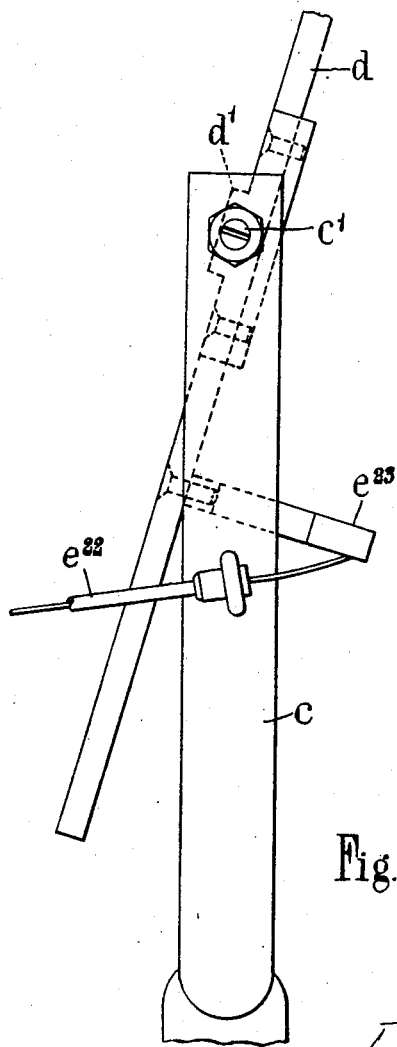
Figure 3 is a side view of another part of the apparatus.

The apparatus is completed by a head-rest which, in one convenient form consists of two tubular pieces $f^1f^2$ having their lower extremities mounted upon feet $g^1g^2$ which are provided with level adjusting screws $h$ at their extremities. The tubular members are mounted upon pins or the like secured to the feet and suitably inclined thereto. The upper ends of the tubular pieces are inturned towards one another, as more clearly seen in Figure 2, and between them is located the head-rest proper which consists of two cylindrical end pieces each having a groove therein to co-operate with a set screw $i$ in the end of the corresponding tubular piece and a central flat portion $k$ which constitutes the head-rest proper. The arrangement is such that, when assembled, the head-rest may be rotated but cannot be removed from its support until the set screws are slacked back out of engagement with the grooves.

Associated with the head-rest is the frame assembly for the mirror and this conveniently consists of two members $l^1l^2$ grooved to take the mirror $m$ and held together so as to grip the glass by bolts $n$ and the assembly also includes two rod members $o$ extending therefrom and each adapted to be pivoted in one end of an arm of link member $p$ the other end of which is pivotally supported upon one of the main tubular supports $f^1f^2$. The frame may thus be rotatable about the axis of the extending rod members which axis is co-linear with the upper or front coated surface of the mirror and it may be fixed in any adjusted position by means of terminal knobs $o^1$ upon the rod members. Also the whole assembly may be rotated about the tubular pieces and may be fixed in any adjusted position by set screws, the purpose of these two adjustments being to set the mirror in position and at the proper angle as will hereafter be described.

The composite piece is of such size that the mirror may be held firmly at a distance of some twelve inches from the drawing surface with adjustments as described to suit the individual operator as well as to collimate the instrument.

Having assembled the instrument and set up the parts as in Figure 1, set the mirror axis $o$, by adjusting the link members $p$, so that the height of the axis $o$ above the drawing surface is equal to the height of the X axis, thus making the Z axis horizontal. Set the mirror at 45° to the drawing plane, using set squares or other convenient means. Lock all set screws.

Collimation may be effected in a number of ways, a suitable procedure is as follows. Upon a piece of drawing paper of suitable size a central line is drawn across the width of the paper. At one edge two shorter lines are drawn of which the distance apart is the width of the base piece $a$, the line first drawn being centrally between these. Thus when the base $a$ is placed with its edges coincident to the shorter lines, the central line becomes the Z' axis. Let the normal to the drawing plane, from the trace of the Z axis with the plane of the mirror, be called the Y' axis, then the Y, Z, Y' and Z' axes are in the same plane, which plane is at right angles to the drawing plane and is known as the principal plane of the projection.

The instrument is collimated when the mirror is set at right angles to the principal plane and the eye, the perspective centre, is placed in the continuation of the Y' axis.

This may be very rapidly effected as follows. Set the scale at one to one, i. e. so that the virtual image of the principal point lies in the drawing plane. This may be determined with precision by the absence of parallax at the exact setting. Rotate the head-rest assembly until the image of the Y axis coincides with the Z' axis, the tilt about the X axis being set at zero, thus setting the mirror at right angles to the principal plane. It should be noted that a very fine slow motion adjustment is provided by means of the thumbscrews on the feet of the head-rest assembly. Check that the copy board is central in the field of view, and that parallax is still absent. Mark the position of the virtual image of the principal point by a short line at right angles to the centre line. Enlarge the scale, by drawing the slide towards the mirror, until the image of the copy board principal point begins to blur and, with the forehead in contact with the rest, set the eye so that the virtual image coincides with the previously marked position on the centre line, thus setting the eye in the Y' axis. Now, however the scale is changed, or whatever are the tilts given to the copy board, the virtual image of the principal point will continue to coincide with the position originally marked on the centre line. Should the head be moved, the original position at any setting is recovered by merely replacing the head so that the image is in coincidence.

It should be noted that the instrument may be collimated whether or not the transparent mirror be set precisely at 45°, and whether or not the Z axis be accurately parallel to the drawing plane. Inaccuracies in the foregoing only result in the virtual image travelling up and down in a straight line—the Y' axis—which is not normal to the drawing plane, which condition will in no way affect the method of rectification to be described.

In order to rectify a photograph containing four control points one of which is the principal point, the photograph is mounted on the copy board with its principal point coincident with that of the transparent copy board, which may be used as a light table for this purpose, and is fastened down flat by means of rubber bands, clips, or other suitable devices. When the principal point is not a control point, its position should be determined by the four-point construction, or by such other means as may be available. On a transparency of the master grid the relevant control points are marked and this is then reversed and placed in approximate orientation on the drawing surface so that the image of the principal point is coincident with the grid position thereof. The image scale is then set to the closest approximation to the position of the remaining three points, the grid trace being rotated about the principal point to the proper orientation. The tilt control knob $e^3$ is then moved backwards and forwards in a corkscrew path so as rapidly to encompass all possible combinations of X and Y tilt and the movement is stopped at the position which gives the least deviation of the points when a slight scale change together with, if necessary, a slight change in orientation and a further small movement of the tilt control knob will complete the setting whereupon the tilt control is locked.

The photograph is now rectified into the grid control and detail may be traced off in the ordinary way.

During the setting operation lighting is not critical but when the setting is made it will be found that, with the particular ratio between the strengths of the two images obtained with the mirror design in accordance with the invention, adjustment to the operator's comfort may be readily made by means of a desk lamp directed towards both the copy and the work, rather stronger illumination being required upon the work. A further means of attaining this end results from illuminating the copy board (which is transparent) by transmitted light so that the operator may thus at will illuminate the copy by transmitted or reflected light while illuminating the work as he wishes, the whole being under control and adjustable for the particular intensities and intensity ratio desired.

It will be seen that a mirror image will result from the use of the instrument as described. For most mapping purposes this is of no moment since correction may be made at a subsequent stage, for example where Ozalid prints were obtained, by exposing with the worked side in contact with the emulsion, rather than in the ordinary manner. There is a consequent advantage in that a sharper print is so obtained. In certain cases however, e. g. when adding detail direct to an existing map, it is expedient to place the photograph face down on the copy board and to use transmitted light to view the print.

The apparatus possesses the following advantages:

(1) Rectification of photographs, including those taken with wide angle lenses, with tilts up to twenty or thirty degrees, and in combination with small scale changes, can be effected in a few minutes.
(2) No particular skill or training is required to enable the rectification to be carried out.
(3) The operator is not unduly fatigued after many hours' continuous use of the apparatus.
(4) The apparatus is readily portable, being capable of being disassembled and packed in a small space, and is capable of withstanding rough treatment.

I claim:
1. Photogrammetric apparatus of the kind wherein means is provided for rectifying distortion of the perspective of photographs due to the optical axis of the camera being divergent due to tilt from that desired comprising means for supporting a photograph, a plane drawing surface, a transparent mirror having a uniform surfacing over the whole front surface of the same such that the incident light is in part reflected and in part transmitted, means for supporting the said mirror at a predetermined distance from the drawing surface on an axis about the centre of and normal to the same, said mirror having adjustable means by which it can be pivoted on the support about an axis parallel to the surface of the mirror and the drawing surface, means for rotating the picture support about two axes at right angles to one another, the intersection of which is at the same distance away from the drawing surface as the mirror pivot, means for moving the picture support to and away from the mirror along a line parallel to the drawing surface and a head rest associated with said mirror support whereby upon supporting the head upon the rest a picture supported on the picture support is viewed in the reflecting surface of the mirror while simultaneously the drawing surface is viewed by light transmitted through the mirror.

2. Photogrammetric apparatus according to claim 1 in which the transparent mirror has a surface such that the intensity of the reflected image is to that of the transmitted image substantially as 5 is to 4.

3. Photogrammetric apparatus according to claim 1 in which the means for supporting the photograph allows of the photograph being illuminated by transmitted light.

LYLE GRAEME TROREY.

REFERENCES CITED

The following references are of record in the file of this patent:

UNITED STATES PATENTS

| Number    | Name      | Date           |
|-----------|-----------|----------------|
| 1,479,691 | Anstock   | Jan. 1, 1924   |
| 1,971,119 | O'Neil    | Aug. 21, 1934  |
| 1,973,592 | Weisinger | Sept. 11, 1934 |
| 2,079,508 | Kaplowitz | May 4, 1937    |
| 2,111,198 | Vice      | Mar. 15, 1938  |
| 2,189,932 | Ball et al. | Feb. 13, 1940 |
| 2,207,190 | Carnahan  | July 9, 1940   |
| 2,342,640 | Buckmaster | Feb. 29, 1944 |
| 2,370,143 | Buckmaster | Feb. 27, 1945 |

FOREIGN PATENTS

| Number  | Country | Date           |
|---------|---------|----------------|
| 326,469 | Germany | Sept. 27, 1920 |